United States Patent [19]
Wattles

[11] 3,881,895
[45] May 6, 1975

[54] MULTISTAGE VORTICAL MASS CONTACT BETWEEN MEDIA

[75] Inventor: Gurdon B. Wattles, North Haven, Conn.

[73] Assignee: Entoleter, Inc., New Haven, Conn.

[22] Filed: Dec. 26, 1972

[21] Appl. No.: 318,683

[52] U.S. Cl. .......................... 55/87; 55/92; 55/178; 55/235
[51] Int. Cl. ............................................ B01d 53/14
[58] Field of Search ................ 55/92, 230, 235–238, 55/87, 178, 90; 261/79 R

[56] References Cited
UNITED STATES PATENTS

| | | | |
|---|---|---|---|
| 2,496,281 | 2/1950 | Fisher | 55/238 |
| 2,732,909 | 1/1956 | Campbell | 55/237 |
| 3,175,340 | 3/1965 | Schulze | 55/238 |
| 3,348,830 | 10/1967 | Pearl et al. | 55/230 |
| 3,412,529 | 11/1968 | Tailor | 55/94 |
| 3,557,535 | 1/1971 | Howick | 55/237 |
| 3,566,582 | 3/1971 | Yankura | 55/92 |

*Primary Examiner*—Charles N. Hart
*Attorney, Agent, or Firm*—Paris, Haskell & Levine

[57] ABSTRACT

Multistage vortical mass contact between one medium in continuous phase and a second medium in discontinuous particulate phase is effected by providing a plurality of vortical contact chambers in concentric and coplanar relationship, one within the next. The continuous medium is caused to flow inwardly from outer stages to inner stages and establish a vortical flow in each stage. The particulate medium is introduced into the flow of the continuous phase medium and suspended therein by its vortical flow and is caused to move outwardly from inner stages to outer stages countercurrent to the flow of said continuous phase medium.

13 Claims, 2 Drawing Figures

3,881,895

MULTISTAGE VORTICAL MASS CONTACT BETWEEN MEDIA

BACKGROUND AND SUMMARY OF INVENTION

The present invention relates to the field of mass contact between two or more media. Mass contact between a plurality of media is utilized for many purposes, such as to transfer material, or physical or chemical energy between the media, as for example: the scrubbing of a dust laden gas such as air by contact with a liquid such as water, humidifying a gas such as air by contact with water, distillation of volatile components from a liquid by contact with a gas, heating or cooling a gas by contact with a warmer or cooler liquid, and the chemical reaction between components contained in two media. Mass contact between media is utilized for other purposes than transfer, as for example where one of the media may include a catalyst for effecting a reaction in another medium. Obviously, there are other purposes of mass contact between media than those suggested, and it is contemplated that the present invention is applicable to many diverse instances where mass contact between two or more media is desired. Although the present invention is described herein primarily in reference to the mass contact between a liquid and a gas, such as between water and air, for scrubbing, humidifying, and/or cooling the air, it is quite apparent that the invention is not limited thereto.

One well known and common approach to mass contact is to establish a vortical flow of a gas in a chamber, suspend particles of a liquid in said flow, and then separate the liquid from the gas. Particulate contaminants in the gas can be taken up in the liquid, thus purifying the gas. Also, gaseous components soluble in the liquid can likewise be removed from the gas medium, and the gas might be cooled by the liquid medium and/or humidified if the liquid is water. The present invention is concerned generally with this vortical flow type of mass contact.

One particularly effecient form of vortical mass contact is set forth in U.S. Pat. No. 3,566,582, issued on Mar. 2, 1971 to E.S. Yankura, and assigned to the assignee of the present invention. The present invention embodies an improvement in said patented mass contact approach. In said patent, vortical gas flow is established by forcing a gas, such as air, from the outside to the inside of an annular vane cage or louvered chamber, wherein the vanes or louvers are oriented at an angle between tangent and orthogonal to the annular configuration of the chamber. Thus, air or other gas entering the chamber in the slots between the louvers is given a directional flow having both radially inward and tangential directional components. The entering gas thus circulates about the interior of the chamber, and ultimately exits through an axial opening at one end of the chamber. A vortical gas flow pattern is thus established.

A liquid, such as water, (or other material having a substantially greater density than that fluid forming the vortical flow pattern) is introduced into the vortical gas flow, and this may be done in many ways. One way is to maintain a pool of water in the bottom end of the louvered chamber opposite from the end that has the axial opening through which the gas flow exits. The vortical gas flow picks up droplets of liquid from the pool and creates a cloud-like suspension of liquid droplets in the vortical flow pattern. This cloud of liquid particles circulates with the gas flow and is concentrated in an annular zone extending inwardly from the annular louver arrangement which defines the chamber.

In the Yankura system, the suspended liquid droplets are acted on by two forces: one is the centripetal force of the radial inward component of gas flow, which tends to draw the droplets inwardly of the vortex and finally out the axial opening of the vane cage; the other force is the centrifugal force created by the tangential component of the gas flow and the mass of the individual droplets, which tends to cause the droplets to migrate outwardly of the vortex and to the louver wall of the chamber. As explained in the Yankura patent, these effects cause a constant inward and outward migration of droplets in the suspended cloud depending on droplet size. Ultimately, large droplets which have a strong tendency to move outwardly under the influence of centrifugal force, are permitted to move outside the louvered chamber through apertures or slots provided for this purpose in the louvered wall.

It is this latter feature that leads to the present invention. In accordance with the present invention, two or more louvered chambers or vane cages, each of the type described in said Yankura patent, are arranged concentrically and in substantial coplanar configuration, one within another, so the cloud effluent passing outwardly of the vanes of an inner chamber is taken up as a liquid feed for the cloud of the next outward louvered chamber surrounding said inner chamber. In this way, a true countercurrent flow between gas and liquid can be established through successive gas vortices and clouds of liquid droplets contained in each of the concentric louvered chambers. Each louvered chamber and the vortical flow therein thus provides a separate mass contact stage.

It is therefore one object of the present invention to provide for mass contact between a plurality of media.

Another object of the present invention is to provide for mass contact between a plurality of media by establishing a vortical flow of one media and suspending particles of another media in said flow.

Another object of the present invention is to provide for mass contact between a plurality of media by establishing a vortical flow of one media and suspending particles of another media in said flow, and causing at least partial countercurrent flow between said two media.

And stil another object of the present invention is to provide for mass contact between a plurality of media by establishing a plurality of vortical flow patterns of one media in substantially concentric and coplanar relationship and in sequential stages from outermost to innermost vortical pattern, and suspending particles of another media in said vortical flow patterns, wherein at least a portion of said other media flows from inner to outer vortical flow patterns.

Other objects and advantages of the present invention will become apparent from the subsequent illustrative detailed description of one embodiment thereof, presented to facilitate a clear understanding of the invention.

BRIEF DESCRIPTION OF DRAWINGS

The following detailed description of one embodiment of the invention is presented in conjunction with the accompanying drawings, in which like reference numberals refere to the same or corresponding parts, and wherein.

DETAILED DESCRIPTION

Figure 1:
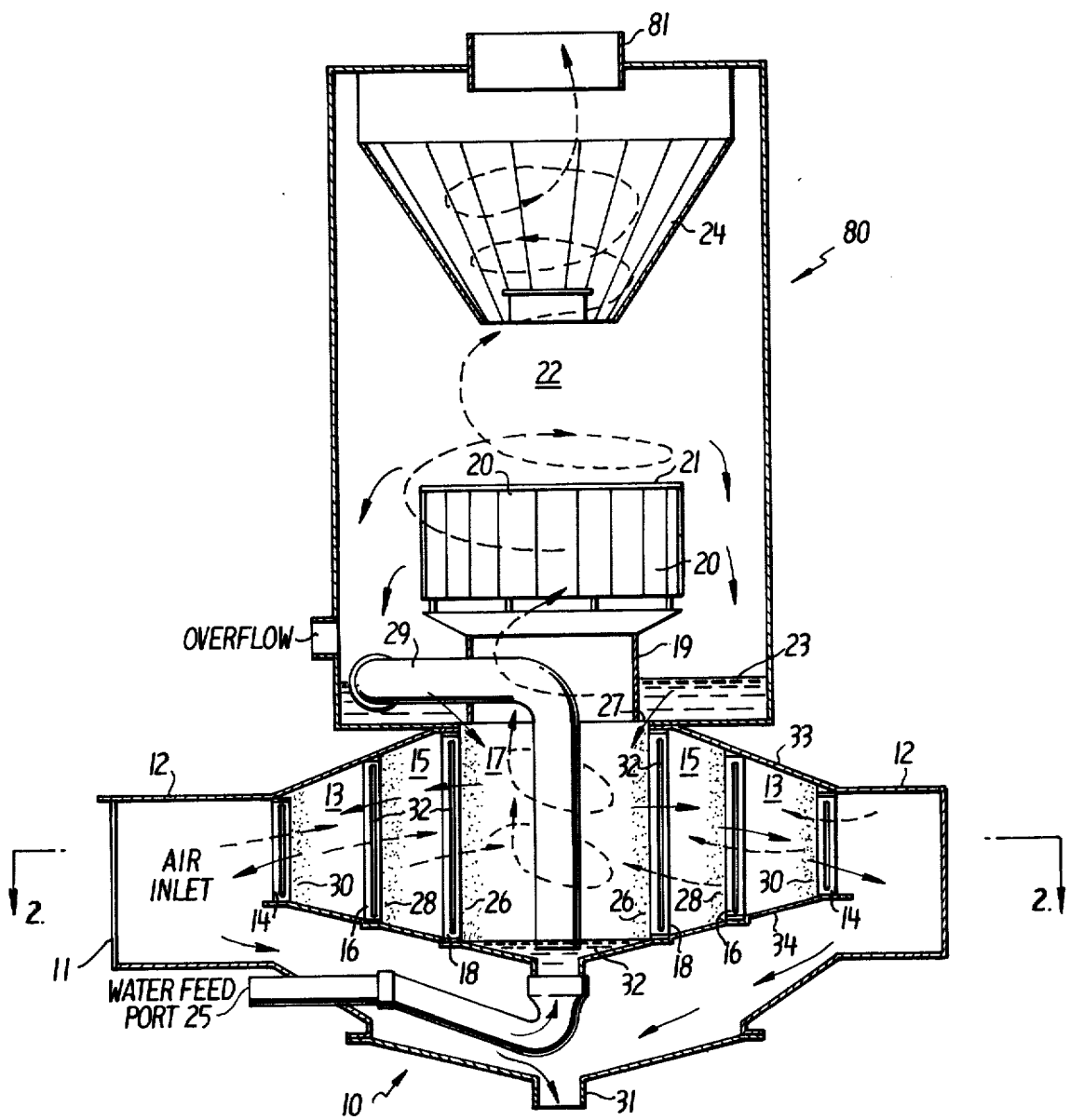
FIG. 1 is a vertical sectional view of a mass contact apparatus illustrating its operation for the treatment of air with water.
Figure 2:
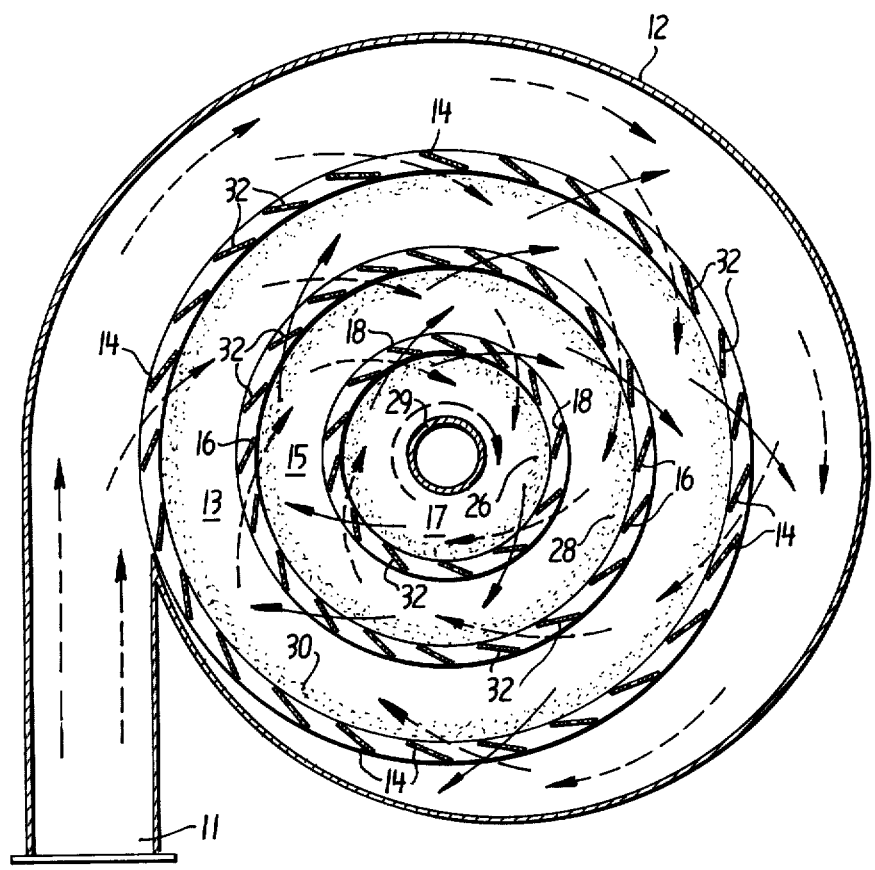
FIG. 2 is a cross sectional view of the apparatus of FIG. 1 taken along the line 2—2 in FIG. 1.

The apparatus shown in the drawings comprises two primary sections. The first section 10 is a three stage mass contactor embodying the principles of the present invention, and the second section 80 is deentrainment section to effect final separation between the media treated in the contact section 10. The deentrainment section itself constitutes no part of the present invention. Air flow through the apparatus is usually effected by a fan or pump (not shown) mounted in the stack 81 atop the deentrainment section 80, or mounted in a duct connected to the stack 81. The fan causes air to be drawn in through the inlet 11 and along the scroll 12. Air flow is generally indicated by the dashed arrows in the drawings. Air from scroll 12 enters the first annular vane or louvered chamber 13 by flowing between the vanes or louvers 14; from chamber 13 the air passes between the vanes 16 into the second vane chamber 15; from there the air moves into the third vane chamber 17 through vanes 18. The air vortex in vane cage or chamber 17 spirals upwardly through the central guide 19 and then exits between the vanes 20 of cage 21. The air is given an expanding spiral impetus as it leaves cage 21 to enter the expansion chamber 22, and as the air continues its spiral course most of the water that it may have entrained from the contactor section separates and accummulates at the bottom of chamber 22 in pool 23. Finally, the air enters a conical vane cage 24, whose vanes are oriented to reverse the direction of spiral motion of the air, and thereby effect a final stripping of any entrained water.

Water flow is generally indicated by the solid line arrows. Initial feed and subsequent make up water is introduced through feed line 25 into the bottom of the vane chamber 17, where the vortical air flow picks it up in droplets to form a circulating cloud 26. Water droplets entrained in the vortical air flow and carried into the deentrainment section 80, are separated from the air and collect in the pool 23, from whence the water is recycled to vane chamber 17 through an annular opening 27 between the top of the vane chamber 17 and the bottom of expansion chamber 22. An additional drain 29 is also provided to feed excess water collected in pool 23 to the bottom of chamber 17. Water droplets also pass from the cloud 26 outwardly of the chamber 17 into vane chamber 15 to feed cloud 28. Again, some water particles in this cloud are carried inwardly with the air flow to chamber 17, while other droplets pass outwardly to chamber 13 are partially reentrained by the incoming air in scroll 12 and reintroduced in cloud 30, while the remainder is collected on the floor of the housing and flows to the drain 31.

Considering the contact action in vane cage or chamber 17 in greater detail, air enters this chamber from chamber 15 through the spaces between the vanes 18. Vanes 18 are set in a circular configuration to define the cylindrical chamber 17, and are oriented at an angle between tangent and orthogonal relative to said circular configuration. Thus the entering air is given a direction of travel that includes both a radial inward component and a tangential component, and thereby establishes a circulating and vortical flow pattern, ultimately exiting through the guide 19 into the deentrainment section 80. This air flow pattern picks up water from the pool 32 on the bottom of chamber 17, and breaks it up into small droplets to form the cloud 26. Cloud 26 circulates with the air flow effecting extensive mass contact between the water particles and the air passing therethrough. As explained in detail in said Yankura U.S. Pat. No. 3,566,582, the very fine water droplets tend to be carried radially inward with the air flow and to be entrained therewith. However, in the case of large droplets of water, because of their greater mass and because of the circumferential velocity imparted thereto by the circulating air pattern, they obtain a centrifugal force greater than the drag force of the inward component of the air, and they therefore migrate outwardly.

Thus, a condition is established in cloud 26, by proper control of the parameters, wherein there is a constant inward migration of some water particles and outward migration of others; and this condition is in a constant state of flux as smaller inwardly migrating particles agglomerate into larger particles and then migrate outwardly, while larger outwardly migrating water particles are broken up into smaller particles and then migrate inwardly. During this process, very extensive contact is effected between a large volume of air and a relatively small quantity of water.

Ultimately, a percentage of fine water droplets are carried off with the air into the deentrainment section 80. Likewise, a percentage of larger droplets move outwardly to the vanes 18 and pass through the slots 32 into vane chamber 15. As in the case of air entering chamber 17, when the air enters chamber 15 from chamber 13, the angular orientation of the vanes 16 imparts a circulating and inwardly spiraling flow pattern to the air. The large water droplets that moved outwardly from chamber 17 through its vane wall into chamber 15 are caught up in this air flow, and are broken up to form the cloud 28. Cloud 28 responds to the air flow in chamber 15 in the same way as cloud 26 in chamber 17. Thus, some fine droplets of water are entrained with the air and are carried with the air from chamber 15 to chamber 17, while larger droplets of water migrate outwardly from chamber 15 through the slots 32 in its vane wall into chamber 13 to feed or sustain cloud 30 therein. The interaction between air and water droplets in chamber 13 is, of course, the same as described for the other vane chambers, resulting in some smaller water droplets from cloud 30 being carried by the air flow into chamber 15 while some larger droplets pass outwardly of the chamber 13 through slots 32 in the vanes 14 to scroll 12.

From the foregoing description it will be seen that there exists a constant inward and outward flow of water droplets, not only within each cloud, but likewise between the several vane chambers and the several clouds contained therein. Obviously, the stability of each cloud, or the proportion of inward migration of water droplets and the proportion of outward migration between the several chambers or stages of the system, is an interralated function of such operational parameters as the rate of feed of gas or air through the system, its pressure drop, the angle of the vanes, and the dimensions of the louvered chambers. However, because of the recycling of entrained water from the deentrainment pool 23 to the vane chamber 17, the system can be operated so that essentially all net ultimate water flow is from the feed pool 32, through the several stages of the system emboided in the chambers 17, 15 and 13 and their respective clouds 26, 28 and 30, to the air inlet scroll 12 and the water drain 31. This system therefore represents true countercurrent vortical mass contact between two or more media.

It will be observed that in the drawing the top plate 33 of the contactor section 10 has a downward slope moving radially outward, while the bottom plate 34 has an upward slope moving radially outward. The purpose is to equalize substantially the circumferential sectional area at all points. Obviously, depending on the mode of operation sought, this need not be done. Also, the system is shown with three stages or vane chambers. This number may obviously be increased or decreased. The system is shown with all water feed, fresh and recycle, going to the central stage or chamber 17. This may be varied by the introduction of either fresh or recycle feed, or both, to other stages as well. One might also make the height of the vane chambers adjustable in the manner and for the purpose described in the copending application of E.S. Yankura and G.B. Wattles Ser. No. 111,933, filed Feb. 2, 1971. The fresh water feed at 25 could be effected by a pump, or alternatively the pressure differential in chamber 17 can be used to draw in water from a reservoir. In the latter instance, if it were desired to have some fresh water feed to each stage, since all stages are essentially on the same plane or at the same height, the pressure differential at each stage could be used to draw in the requisite feed water.

The foregoing description of one embodiment of the invention is presented for illustrative purposes only. It is obvious that other variations and modifications besides those mentioned herein will become apparent, and such as are embraced by the spirit and scope of the appended claims are contemplated as being within the purview of the present invention.

What is claimed is:

1. A multistage vortical mass contactor comprising at least first and second vortical contact stages, each of said stages comprising a vaned louvered wall arranged in overall circular configuration with the vanes thereof oriented at an angle between tangential and orthogonal to said circular configuration, the two louvered walls being substantially concentric and being substantially coplanar with one being located inside the other and spaced radially inward therefrom defining an annular space between said walls, housing means at the axial ends of said walls closing the axial ends of said annular space, the inner wall defining a cylindrical space, additional housing means closing one axial end of said cylindrical space, said cylindrical space having an opening at the other axial end thereof, the vanes of both said walls extending substantially the full axial length of the respective walls and being spaced from each other circumferentially about said walls to provide openings therebetween that extend uninterruptedly for substantially the full axial length of the respective walls, said vanes having apertures therein, means for forcing a first, continuous phase medium to flow from the exterior of said outer louvered wall therethrough and into said annular space and thence through the inner louvered wall into said cylindrical space and thence through said opening, whereby a vortical flow of said medium is established in each of said stages, and means for introducing a second medium into the flow of said first medium, whereby said second medium is suspended in particulate form in said first medium and is caused to circulate as an annular cloud in each of said stages with larger particles migrating radially outwardly in said clouds and smaller particles migrating radially inwardly in said clouds, and with a portion of said larger particles migrating radially outwardly from said clouds and through said apertures in said vanes of said louvered walls and a portion of said smaller particles migrating radially inwardly from said clouds entrained in the flow of said first medium.

2. A contactor as set forth in claim 1, wherein said second medium is a liquid and said particles are droplets, and wherein a portion of said outwardly migrating particles are broken up into smaller inwardly migrating particles and a portion of said inwardly migrating particles are agglomerated into larger outwardly migrating particles.

3. A contactor as set forth in claim 2, wherein said second medium is water.

4. A contactor as set forth in claim 2, wherein said first medium is gaseous and has particulate material suspended therein.

5. A contactor as set forth in claim 1, wherein said first medium is gaseous and has particulate material suspended therein.

6. A multistage contactor as set forth in claim 1, and further including a housing in the form of a scroll input therefor.

7. A multistage contactor as set forth in claim 6, and further including a separator coupled to said opening for receiving the flow of said media from said opening and separating said media from each other.

8. A method of effecting mass contact between a first material in continuous phase and a second material in discontinuous phase particulate form having a substantially greater density than said first material, comprising feeding said first material through at least two vortex generating chambers wherein each chamber is defined by a louvered wall of substantially circular overall configuration and whose louvers are oriented between tangent and orthogonal to said circular configuration, said chambers being substantially concentric and substantially coplanar with one being located inside and radially inward of the other, the inner chamber having an exit port at one axial end thereof, said first material being fed through the outer louvered wall into the outer chamber forming an inwardly spiraling vortical flow in said outer chamber and then through the inner louvered wall into the inner chamber forming an inwardly spiraling vortical flow in said inner chamber and then being fed through said exit port, introducing said second material into the feed path of said first material to suspend particles thereof in said first material, and forming a cloud of said suspended particles circulating in an annular zone in each of said chambers, each said cloud having a distribution of particle sizes with larger ones of said particles migrating outwardly and smaller ones of said particles migrating inwardly of said annular zone, a portion of said larger ones of said particles being caused to migrate outwardly through the louvered wall of the respective chamber, and a portion of said smaller ones of said particles being caused to migrate inwardly and out of the respective chamber with the flow of said first material.

9. A method as set forth in claim 8, wherein said second material is a liquid and said particles are droplets, and wherein a portion of said outwardly migrating particles are broken up into smaller inwardly migrating particles and a portion of said inwardly migrating particles are agglomerated into larger outwardly migrating particles.

10. A method as set forth in claim 9, wherein said second material is water.

11. A method as set forth in claim 9, wherein said first material is gaseous and has particulate material suspended therein.

12. A method as set forth in claim 8, wherein said first material is gaseous and has particulate material suspended therein.

13. A method as set forth in claim 8, wherein at least a portion of said second material is introduced into said feed path in said inner chamber.

* * * * *